Patented Oct. 13, 1942

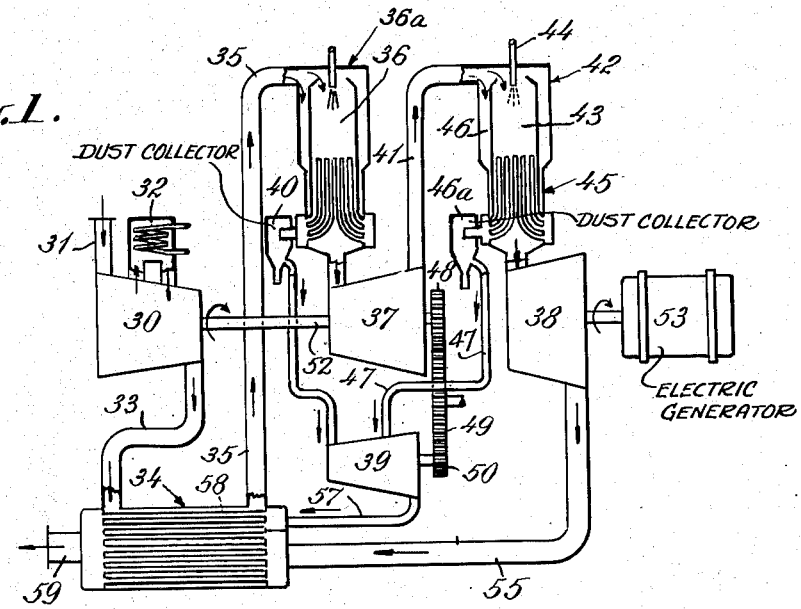
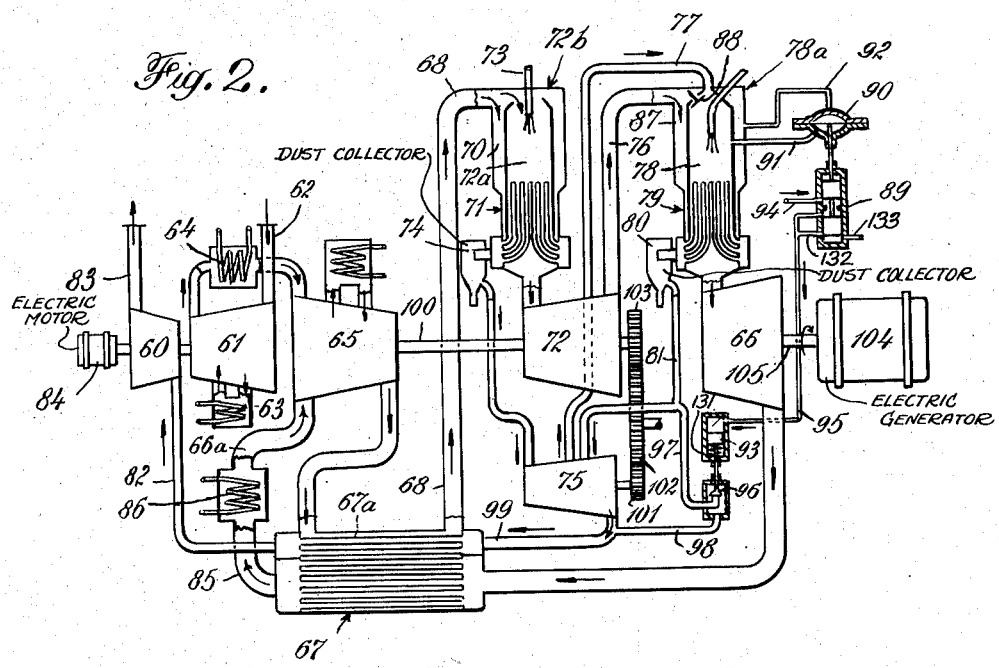

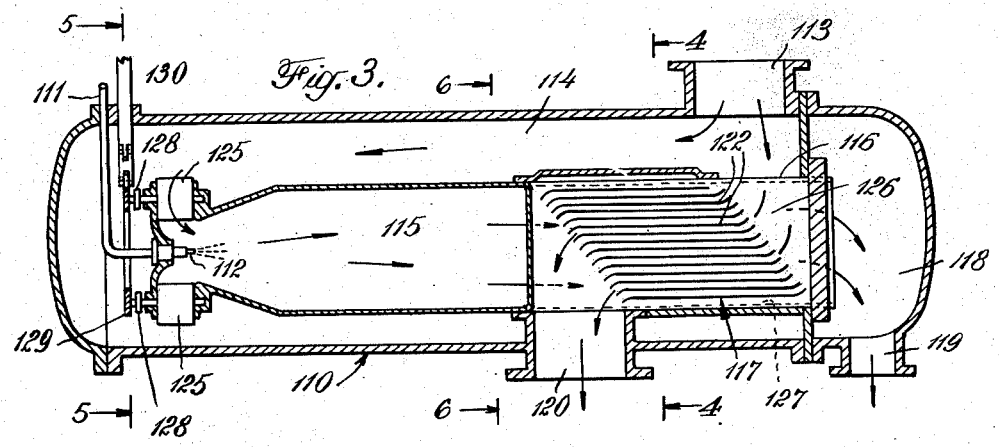

2,298,663

UNITED STATES PATENT OFFICE 2,298,663

GAS TURBINE PLANT

Walter Traupel, Winterthur, Switzerland, assignor to Sulzer Frères, Société Anonyme, Winterthur, Switzerland Application June 26, 1940, Serial No. 342,424
In Switzerland June 28, 1939

17 Claims. (Cl. 60—41)

This invention relates to an improved gas turbine plant and has for its object the provision of an improved gas turbine plant comprising a turbine, preferably a high pressure turbine, arranged to drive a turbo compressor, and a combustion heating device constructed and arranged to heat a part of the air compressed in the turbo compressor by combustion in a combustion space and means to pass the other part of the compressed air in heat exchange contact with the gas of combustion to cool the gas and heat the air. The apparatus includes means for utilizing the combustion gas and compressed air from the heat exchanger to drive separate high pressure turbine blades or to drive separate expansion turbines.

The high pressure turbine is preferably arranged to pass the expanded gas therefrom through combustion means and to a low pressure turbine which drives the load. The heating device preferably includes a heat exchanger arranged between the combustion space and the turbine, preferably of such dimensions that sufficient of the heat of the gas from the combustion space (combustion gas) is transmitted to the air passed in heat exchange relation thereto that the air and gas have practically the same temperature at the outlet from the heat exchanger.

The invention aims to provide a gas turbine plant comprising a heating device arranged to receive gas discharged from a high pressure turbine, to heat a part of the gas in combustion and to pass the remaining part of the gas in heat exchange relation to the combustion gas, and a low pressure turbine arranged to be driven by the gas from the heating device. In addition to the aforementioned plant arrangements the invention contemplates the provision of an exhaust gas turbine, with or without auxiliary motor power, driving a supercharging blower arranged to charge air into the inlet side of the turbo-compressor. It is advantageous to provide means for passing the combustion gas from the heating devices to a gas turbine which is operatively coupled to the high pressure turbine, and the other part of the gas or heated air to high and low pressure turbines.

Apparatus is also provided to pass a part of the combustion gas expanded in a special turbine to another combustion space. The gas from the said combustion space is passed to a heat exchanger and in heat exchange relation with the other part of the gas from the special turbine. The two parts of gas are practically at the same temperature as discharged from the heat exchanger. If the expansion has to be carried out in at least two stages, it is preferable to allow the working medium to do the work necessary for compressing in a first stage and after an intermediate heating to use it in a second stage for developing power to be delivered outside the turbine. A gas turbine plant according to the invention may preferably be extended by a supercharging group consisting of a turbine and a blower, this turbine being supplied with working medium which has already given up part of its energy to produce useful mechanical energy. The two parts of the working medium are preferably led in counter-current through the heat exchanger.

The invention also makes it possible to free the combustion gas from impurities in a dust collector since the combustion gases leave the heat exchanger at a temperature which will not damage the dust collector. It is possible to pass the greater part of the working medium through the plant as pure air, so that the important parts of the plant, particularly the turbines and exchangers, are protected from dust. Dividing the working medium into one part that is led through the combustion space, and into another part that does not take part in the combustion, also makes it possible to pass the combustion gases through the plant separately from the pure air, so that suitable machines and heat exchangers may be adopted for the combustion gases. In addition to that, the working medium not taking part in the combustion may be used again after being recooled in the plant, so that the compression energy still contained in it may be utilized.

The accompanying drawings illustrate more or less diagrammatically apparatus embodying the invention, in which:

Fig. 1 shows an example in which the portion of the working medium heated in the combustion chamber and the portion heated by heat exchange are expanded separately in separate turbines;

Fig. 2 shows another example in which there is also provided a separate supercharging turbo unit;

Fig. 3 illustrates, on an enlarged scale, a sectional view of a heating device;

Fig. 4 is a section through 4—4 in Fig. 3;
Fig. 5 is a section through 5—5 in Fig. 3; and
Fig. 6 is a section through 6—6 in Fig. 3.

In the plant illustrated in Fig. 1, the turbocompressor 30 draws in air through opening 31 and compresses it, with intermediate cooling in the cooler 32. The air flows through pipe 33 into heat recuperator 34 and then flows through pipe 35 to the combustion space 36 of the heating device 36a. Special turbines 37 and 38 are provided for utilizing the energy in the heated air, and another turbine 39 for utilizing the energy in the combustion gas. The heated air expands in the high pressure turbine 37, while the combustion gas, after being cleaned in the dust collector 40, passes into the turbine 39.

From the high pressure turbine 37, the working medium enters pipe 41 and passes into the intermediate heating device 42, which works exactly in the same manner as the heating device 36a. Consequently, a part of the air is passed into the combustion space 43 where it becomes highly heated by the fuel burning at the nozzle 44 and then flows through heat exchanger 45, while the other part of the air passes into space 46 and is brought up to a higher temperature in passing through the heat exchanger 45. A part of the combustion gas now passes through dust collector 46a and pipe 47 into turbine 39, while the air is passed into the low pressure turbine 38.

High pressure turbine 37 and gas turbine 39, which are coupled together by gears 48, 49 and 50, drive turbo-compressor 36 through shaft 52, while low pressure turbine 38 drives the electric generator 53. After leaving turbine 38 the air is passed through pipe 55 to heat recuperator 34, while the exhaust from turbine 39 is passed through pipe 57 also into heat recuperator 34. But this gas flows through special heat exchange elements 58 (for instance tubes or pockets), and is consequently then mixed with the air. Such a mixture takes place first of all at the outlet 59, through which the whole of the working medium leaves the plant.

In the plant of Fig. 2, a special turbo set, consisting of an exhaust gas turbine 60 and a supercharging blower 61 is provided and it raises the working medium of the rest of the plant to a higher pressure. Blower 61 draws air through opening 62, compresses it with intermediate cooling in the intermediate cooler 63, and forces it through cooler 64 to the main compressor 65 where it arrives in a very compressed state (for instance at a pressure of 4 atm.). The exhaust leaving low pressure turbine 66 is also passed to the main compressor 65 through pipe 66a from heat recuperator 67. This exhaust contains a relatively great quantity of air.

The operation of the remaining parts of the plant proceeds similarly as in the plant of Fig. 1, except that the whole working process takes place at a higher pressure range. After the main compressor 65 has delivered air into pipe 68 through heat recuperator 67, a part of the air is passed through space 70, heat exchanger 71 and then into turbine 72. Another part of the air flows through the combustion space 72a of the heating device 72b and burns fuel discharged through the nozzle 73. The combustion gas is passed through heat exchanger 71, so that both parts of the working medium are brought to approximately the same temperature.

The combustion gas is cleaned by the dust collector 74, and then passed to gas turbine 75. After the combustion gas has expanded in turbine 75 to approximately the same pressure as exists in pipe 76, it is passed through pipe 77 into combustion space 78 of the heating device 78a. The gas is there again heated up by further combustion and passed as in the plant of Fig. 2, through heat exchanger 79, dust collector 80 and pipe 81 back into turbine 75.

In this plant arrangement, the combustion gas flows through the recuperator 67 in heat exchange elements 67a which are separate from the passages through which the pure air flows. The gas then passes through pipe 82 into turbine 60 from which it is discharged through pipe 83. Turbine 60 drives the blower 61. Any additional power required is supplied by the electric motor 84. The pure air, on the other hand, which has been utilized in turbines 66 and 72 passes from pipe 85 into cooler 86 and then into blower 65 through pipe 66a.

In order that the pressure in combustion space 78 and in the enclosed space 87 may be practically the same, a valve 88 is provided which allows air to flow from space 87 into space 78 as soon as the pressure in space 87 is appreciably greater. If, on the other hand, the pressure in space 78 is temporarily greater than in space 87, the valve 89 is raised under the influence of the diaphragm 90. Diaphragm 90 is actuated under the influence of the pressures in spaces 78 and 87 through the pipes 91 and 92.

If oil under pressure is normally passed continuously over piston 93 through the pipes 94 and 95, this piston will be held in the lower position shown and pressing against the piston spring 131. When the diaphragm 90 causes valve 89 to rise, the oil pressure is reduced since then oil can flow away through pipes 132 and 133 and piston 93 rises. Piston 93 is connected to a valve 96 which, as soon as piston 93 rises, allows gas to flow from pipe 81 through pipes 97 and 98 into pipe 99, so that the pressure in pipe 81 and consequently also in space 78 is decreased. This whole device comes into operation only if the approximate equality of the pressures in spaces 78 and 87, which is given by the dimensioning of the separate parts of the plant, should temporarily be disturbed. The turbine 72 drives the compressor 65 through the shaft 100. The turbine 75 is operatively connected to turbine 72 through gears 101, 102 and 103, and the turbine 66 drives generator 104 through shaft 105.

The heat transmission is effected in such a way that the same pressure exists on both sides of the heat exchanger. This has the advantage of ensuring that the tubes or other heat exchange elements do not suffer from mechanical stresses.

By means of the invention, the advantage is obtained that the pressure prevailing on both sides of the heat exchange elements is very high, so that an excellent heat transmission is obtained which consequently requires very small heat exchange surfaces. Further, in plants which are constructed according to the invention, fuel such as pulverized coal, which forms fly ash, may be economically employed. Dust collectors can be used in the manner described without the total quantity of working medium passing through the plant being affected by the fall of pressure caused by such apparatus.

Fig. 3 shows a heating device 110 in which the fuel supplied through one or more fuel pipes 111 is injected through one or more nozzles 112. Through opening 113 the total quantity of compressed air enters, being delivered for instance by a turbo-compressor. The heating devices of Figs. 1 and 2 may be constructed according to this heating device.

A certain part of the air flows through the space 114 in the direction of the arrow and arrives in the combustion space 115, into which fuel is injected through the nozzle 112. The highly heated combustion gas formed in the space 115 is passed through the inner part of the heat exchange elements 116 of the heat distributor 117, which elements are pocket-shaped and have flat walls; it passes from these pockets 116 into the space 118 at a temperature suitable for the turbine blades, and leaves through the opening 119. The combustion gases can also be expanded separately from the rest of the working medium in a separate turbine as provided in Figs. 1 and 2.

The other part of the air flows under the same pressure outside the pockets 116 and leaves the heat distributor 117 through the outlet 120. It is passed to one or more turbines and there expanded. Guide blades 125 may also be provided to give a rotary motion to the air serving for combustion before it enters the space 115.

Fig. 4 shows the heat distributor 117 in cross-section. The outer sides 121 of the pockets 116 are, at least in part, provided with longitudinally-running fins 122, which, on the one hand, increase the heat exchange surfaces and, on the other hand, are bent in such a way that they serve at the same time as directing blades and thus diminish the flow losses. In the interior of the pockets 116 fins 123 may also be provided, although in a much smaller number. They make the temperature of the pockets 116 approximate more closely the temperature of the air than the temperature of the combustion gas.

Passing the working medium through the heat distributor 117 in counter-current, makes it possible to choose the conditions so that the gas issuing from opening 119 and the air issuing from outlet 120 have at least approximately the same temperature. The sides of the heat distributor (passages 126) in contact with the air have a larger surface than the sides (passages 127) in contact with the gases. The heat distributor can also be designed in such a way that the air to be heated flows through the heat exchange elements at a higher speed than the combustion gases.

Fig. 5 shows that the guide blades 125 may be set by the lever 128, ring 129 and rod 130, which is adjusted by the governing apparatus. Fig. 6 shows a section through the combustion space immediately before the ports admitting to the pockets.

The gases led away through outlet 119 may be led through a dust collector.

The invention makes it possible that the temperature of that part of the working medium which is utilized for combustion and the temperature of the remaining part can be made practically equal. It is in fact possible to make the heat distributors of such dimensions that exactly the same temperatures may be obtained in openings 119 and 120. Particularly, however, because of the design of the heat exchange elements as pockets with flat walls, the space required for the heat distributor is extremely small, since a large number of heat exchange surfaces can be located within a given space.

I claim:

1. Gas turbine plant which comprises at least one turbo-compressor, a combustion space in which a part of the compressed working medium is heated, means by which another part of the working medium is passed around the combustion space, a heat exchanger for transmitting heat from the heated gas of the combustion space to the part passed around the combustion space and separate expansion turbines for the gas heated in the combustion space and the part passed around the combustion space.

2. A gas turbine plant as claimed in claim 1, which comprises another combustion space in which one part of the working medium is passed after a first expansion, means by which working medium is passed around said other combustion space and a further heat exchanger for transmitting heat from the heated gas of said other combustion space to the gas passed around the other combustion space and separate expansion turbines for the gas heated in said other combustion space and the gas passed around the other combustion space.

3. A gas turbine plant as claimed in claim 1, comprising means as a first stage of expansion driving the turbo-compressor for compressing the working medium and a second stage in which the working medium is further expanded after an intermediate heating to develop useful work to be delivered outside the turbine.

4. Gas turbine plant as claimed in claim 1, characterized in that the part of the working medium passed through the combustion space is passed through a dust collector.

5. A gas turbine plant as claimed in claim 1, characterized in that the part of the working medium passed through the combustion space and the part of the working medium passed around the combustion space flow in counter-current through the surface heat exchanger.

6. A gas turbine plant which comprises a high pressure turbine, a turbo-compressor arranged to be driven by said turbine, a heat recuperator, means for passing compressed air from the turbo-compressor through the heat recuperator, means for passing gas discharged from the turbine through the heat recuperator in heat exchange relation to the compressed air, a heating device having a combustion space, means for passing a part of the compressed air from the heat recuperator through the combustion space and burning fuel therewith, a heat exchanger for passing the other part of the compressed air from the heat recuperator in heat exchange relation to the combustion gas from the combustion space, and means for utilizing the said compressed air from the heat exchanger and the combustion gas from the combustion space to drive separate high pressure turbine blades.

7. A gas turbine plant according to claim 6 which comprises dust-separating means for cleaning the combustion gas before it is passed into the turbine.

8. A gas turbine plant which comprises a high pressure turbine, a turbo-compressor arranged to be driven by the high pressure turbine, a heat recuperator, means for passing compressed air from the turbo-compressor through the heat recuperator, a heating device, means for passing a part of the compressed air from the heat recuperator to a combustion space of the heating device and burning fuel therein, a heat exchanger for heating the other part of the compressed air by passing it in heat exchange relation to the combustion gas from the combustion space, means for passing the heated compressed air to the high pressure side of the high pressure turbine, a gas turbine, means for passing the combustion gas to the high pressure stage of the gas turbine, a driving gear for operatively connecting said gas turbine to the high pressure turbine, a second heating device, means for passing a part of the expanded air from the high pressure turbine to a combustion space of the second heating device and burning fuel therein, a further heat exchanger for heating the other part of the expanded air by passing it in heat exchange relation to the combustion gas of the second heating device, a low pressure turbine arranged to drive a load, means for passing the heated air from the second heating device to the inlet side of the low pressure turbine, means for passing the combustion gas of the second heating device to an intermediate stage of the gas turbine, and means for passing the expanded gases discharged from the gas turbine and from the low pressure turbine through the heat recuperator and in heat exchange relation to the compressed air from the turbo-compressor.

9. A power plant according to claim 8 which comprises means for removing dust from the combustion gas from each heating device.

10. A power plant according to claim 8 which comprises an intermediate cooler for the turbo-compressor.

11. A power plant according to claim 8 which comprises a pipe for passing gas from an intermediate stage of the gas turbine to the combustion space of the second heating device, and valve controlled means for passing gas expanded in the high pressure turbine into the combustion space of the second heating device.

12. A power plant according to claim 8 in which the second heating device has an enclosed space in contact with the combustion space, a pipe connecting an intermediate stage of the gas turbine with the combustion space, means for passing the gas expanded in the high pressure turbine to the enclosed space, valve means responsive to pressure differences controlling a passage between the combustion space and the enclosed space, and by-pass means responsive to the pressures in the combustion space and the enclosed space for passing combustion gas directly from the second heating device to the heat recuperator.

13. A power plant according to claim 8 which comprises an exhaust gas turbine driving a supercharging blower, means for passing the expanded combustion gas from the heat recuperator to the exhaust gas turbine, and means for passing the compressed gas from the supercharging blower into the turbo-compressor.

14. A power plant according to claim 8 which comprises an exhaust gas turbine, means for passing gas from the heat recuperator to said exhaust gas turbine, an auxiliary motor for the exhaust gas turbine, a supercharging blower driven by the exhaust gas turbine and auxiliary motor, and means for cooling the gas compressed by the blower and passing it into the turbo-compressor.

15. A power plant according to claim 8 which comprises means for cooling the gas passed from the heat exchanger to the turbo-compressor.

16. A power plant according to claim 6 in which the heating device comprises heating elements by means of which the combustion gas and air flow in counter-current heat exchange relation, and the volumes of combustion gas and air and the heat transfer surfaces of the elements are such that the temperature of combustion gas and the air are equalized, the temperature of the combustion gas being reduced to a temperature not destructive to the turbine blades.

17. A power plant according to claim 6 in which the heating device comprises a combustion space, an air space outside the combustion space, adjustable blades for directing the air passed into the combustion space, a nozzle for passing fuel into the combustion space, a plurality of contact elements in the form of pockets provided with fins, and means for passing the combustion gas and the air in counter-current relation over the surfaces of the elements.

WALTER TRAUPEL.